United States Patent [19]

Golobay

[11] Patent Number: 4,570,766
[45] Date of Patent: Feb. 18, 1986

[54] MAGNETIC CLUTCH-BRAKE MECHANISM

[76] Inventor: Gary L. Golobay, 1215 Helen, Augusta, Kans. 67010

[21] Appl. No.: 475,730

[22] Filed: Mar. 16, 1983

[51] Int. Cl.[4] .................... A01D 69/08; A01D 69/10; F16D 67/02
[52] U.S. Cl. ............................ 192/18 R; 192/84 PM; 56/11.3
[58] Field of Search ................ 192/17 R, 18 B, 18 R, 192/48.91, 84 PM; 56/11.3

[56] References Cited

U.S. PATENT DOCUMENTS

| | | | |
|---|---|---|---|
| 2,885,873 | 5/1959 | Beeston | 192/84 PM |
| 2,985,992 | 5/1961 | Dowdle | 56/11.3 |
| 3,312,319 | 4/1967 | Carroll et al. | 192/18 B |
| 4,122,652 | 10/1978 | Holtermann | 56/11.3 |
| 4,295,327 | 10/1981 | Bortolussi | 56/11.3 |
| 4,322,935 | 4/1982 | Poehlman | 56/11.3 |
| 4,418,808 | 12/1983 | Nagai | 192/18 R |
| 4,466,233 | 8/1984 | Thesman | 56/11.3 |

Primary Examiner—Rodney H. Bonck
Assistant Examiner—Alan G. Towner
Attorney, Agent, or Firm—Phillip A. Rein

[57] ABSTRACT

This invention is a magnetic clutch brake mechanism operable to achieve either a clutch or a brake function and can be installed, for example, on a lawn mower apparatus to selectively control the rotating movement of a lawn mower blade member. The magnetic clutch brake mechanism includes: (1) a main actuator assembly; (2) a drive rotor assembly which is connected to a main drive shaft for rotating same; (3) a clutch plate assembly operably connectable to the drive rotor assembly; and (4) in this case, a blade mount assembly to receive a rotatable lawn mower blade that is securely fastened thereto. The main actuator assembly includes an actuator bracket member which is connected to an actuator ring member that is selectively movable axially about the drive rotor assembly and the clutch plate assembly to alter a magnetic field therein. The drive rotor assembly includes a rotor member which is driven by a gasoline or electric motor in order to rotate same at a desired speed. The clutch plate assembly includes a plate member used to secure a plurality of magnet members against a collector member and haivng a bearing member which rotatably connects same about the main drive shaft. The blade mount assembly is connected to the clutch plate assembly and operable to receive a lawn mower blade member thereon by a plurality of nut and bolt members. The actuator ring member is operable to move axially about the clutch plate assembly to selectively affect the magnetic field therein to clutch or brake the relative rotating members.

15 Claims, 6 Drawing Figures

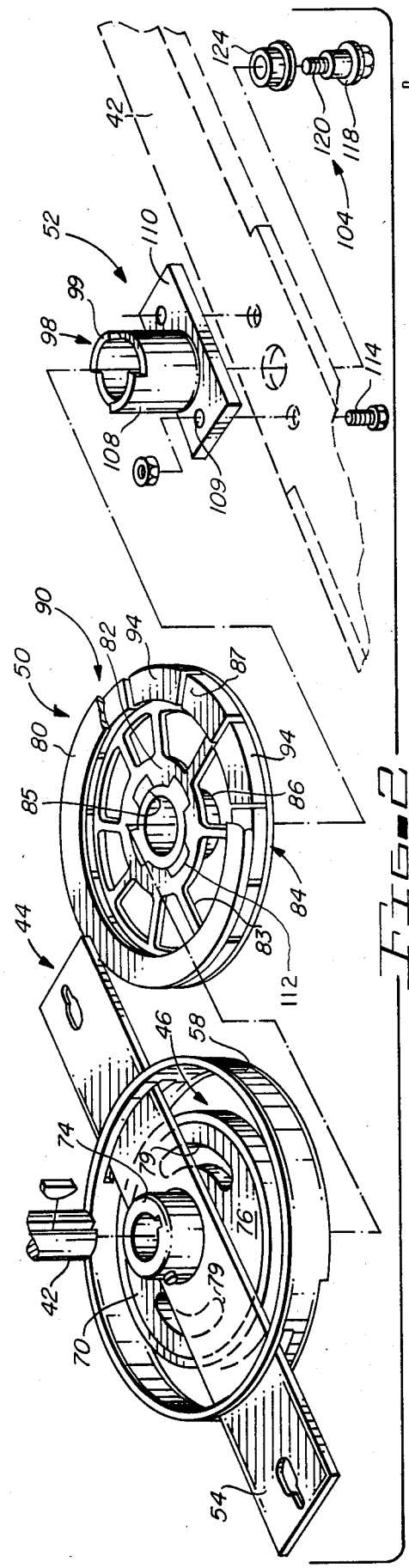
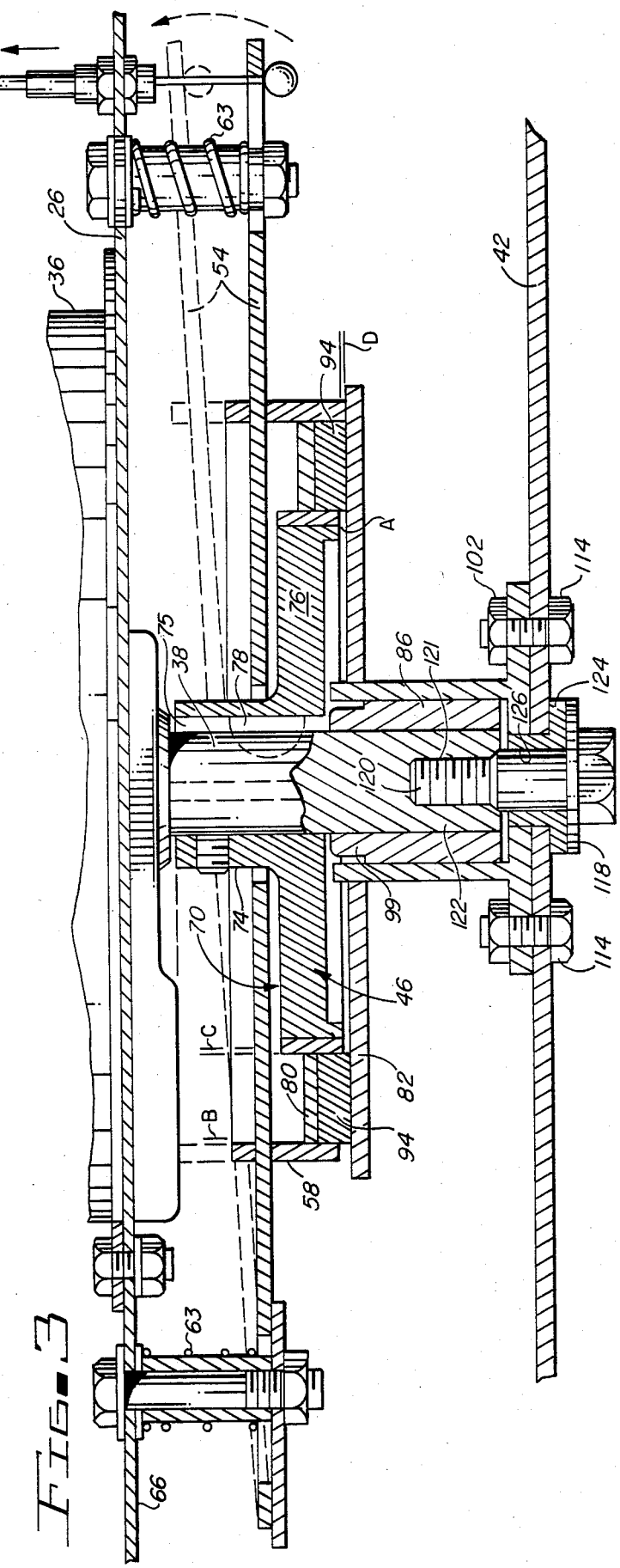
Fig-2
Fig-3

MAGNETIC CLUTCH-BRAKE MECHANISM

PRIOR ART

The following U.S. patents were found during a patentability investigation on the invention set forth herein. The patents are as follows:

U.S. Pat. No. 3,603,437
U.S. Pat. No. 3,292,756
U.S. Pat. No. 4,013,241
U.S. Pat. No. 3,053,365
U.S. Pat. No. 3,842,378

It is seen that the basic function of our invention in utilizing a magnetic field as a clutch or brake mechanism is shown by the prior art references.

The Spencer U.S. Pat. No. 3,603,437 discloses a positive drive clutch or brake structure with axially movable and engaging irregular-shaped faces.

The Allen U.S. Pat. No. 3,053,365 discloses a coupling device using a permanent magnet and having an outer movable ring which mechanically engages members to vary the air gaps in the overall structure so as to achieve coupling and discoupling thereof.

It is noted that the applicant herein has numerous structural features which present patentable subject matter over the references cited herein.

PREFERRED EMBODIMENT OF THE INVENTION

This invention is a magnetic clutch brake mechanism which can be mounted on a lawn mower apparatus structure between the normal power driven power shaft and rotating lawn mower blade member. One embodiment and purpose of this invention is to provide a clutch type structure which can be selectively operable to disconnect and brake the rotating lawn mower blade member from a constantly rotating power shaft. The magnetic clutch brake mechanism includes: (1) a main actuator assembly operable to achieve actuation of the magnetic clutch brake mechanism; (2) a drive rotor assembly having a rotor member secured to a motor driven drive shaft for conjoint rotation therewith; (3) a clutch plate assembly which is adapted to be selectively magnetically coupled with the drive rotor assembly; and (4) a blade mount assembly to receive the lawn mower blade member thereon and connected to the clutch plate assembly for conjoint rotation therewith. The main actuator assembly includes an actuator ring member which is movably axially so as to be magnetically connected or disconnected with the clutch plate assembly. The drive rotor assembly includes the rotor member which is rotatable with the main drive shaft within the confines of the clutch plate assembly. The clutch plate assembly includes a plate member having a plurality of magnetic members sandwiched between the same and a collector member. This creates a magnetic field about the drive rotor assembly which is selectively engageable with the clutch plate assembly. The clutch plate assembly is rotatably mounted through a bearing member on the drive shaft member and having the blade mount assembly secured thereto. A lawn mower blade member is mounted on the blade mount assembly for conjoint rotation therewith. The actuator ring member is movable axially so as to achieve transfer of most of the magnetic field between itself and the clutch plate assembly to achieve respective non-rotation and rotation of the clutch plate assembly.

OBJECTS OF THE INVENTION

One object of this invention is to provide a magnetic clutch brake mechanism which can be utilized both as a braking and as a clutching system.

Another object of this invention is to provide a magnetic clutch brake mechanism capable of utilizing magnetic lines of flux and coaxing elements to provide a braking or clutching action on a rotating member.

One further object of this invention is to provide a magnetic clutch brake mechanism to provide magnetic flux means for disconnecting a rotating drive shaft member from a driven member with a minimum amount of wear there between.

Still, one further object of this invention is to provide a magnetic brake clutch mechanism that is simple in construction; easy to operate; economical to manufacture; and substantially maintenance free.

Various other objects, advantages, and features of the invention will become apparent to those skilled in the art from the following discussion, taken in conjunction with the accompanying drawings, in which;

FIGURES OF THE INVENTION

FIG. 2 is an exploded perspective view of the magnetic clutch brake mechanism of this invention;

FIG. 3 is an enlarged fragmentary sectional view taken along line 3—3 in FIG 1.

Figure 1:
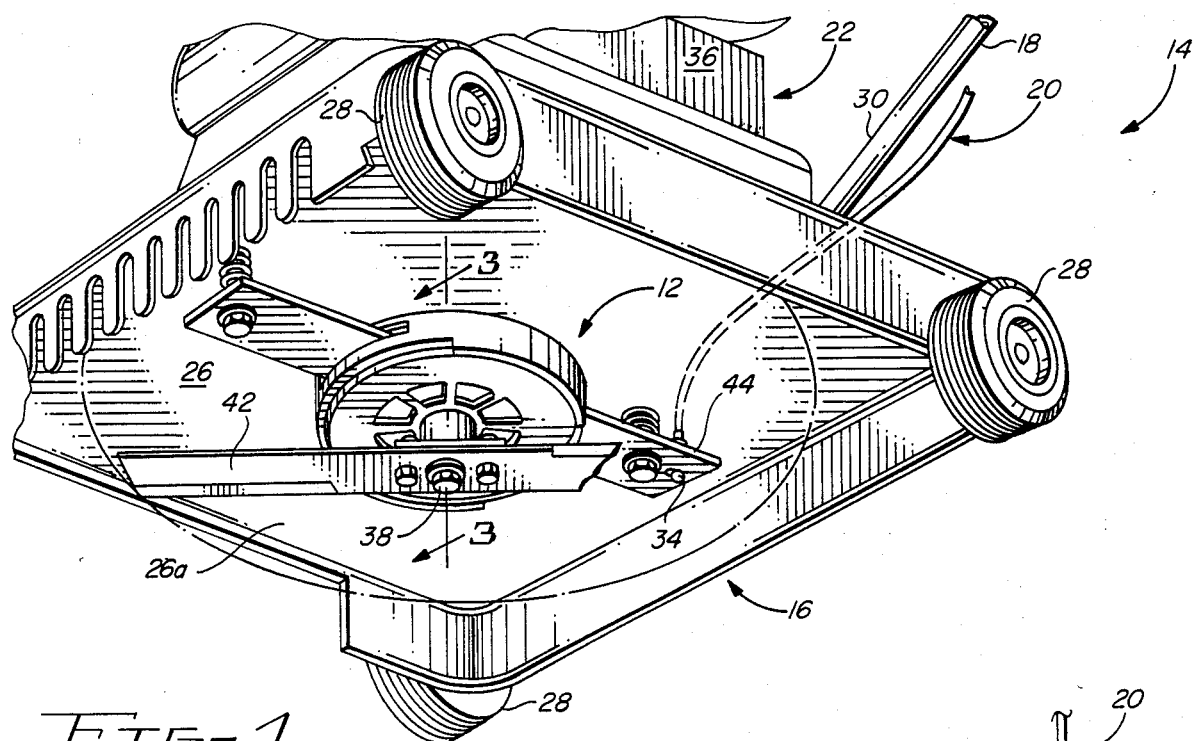
FIG. 1 is a fragmentary perspective view of a lawn mower apparatus having a magnetic clutch brake mechanism of this invention secured thereto.
Figure 4:
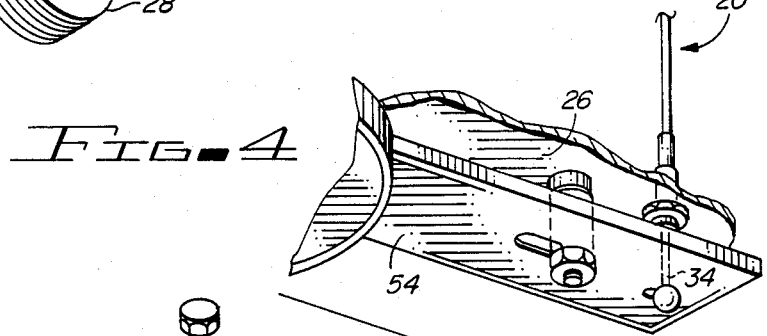
FIG. 4 is a fragmentary perspective view of a portion of main actuator assembly of the magnetic clutch brake mechanism of this invention.

The following is a discussion and description of a preferred specific embodiment of the magnetic clutch brake mechanism of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, a magnetic clutch brake mechanism of this invention, indicated generally at 12, is shown in FIG. 1 as attached to a lawn mower apparatus 14. It is to be understood that the magnetic clutch brake mechanism 12 of this invention is merely illustrated in this form of usage but can be used as a clutching system or a braking system in any device where one wishes to connect or disconnect a rotating member, such as a power shaft, from the item that is being driven.

With the magnetic clutch brake mechanism 12 being utilized as either a clutch or brake system, it is obvious that depends on what one is achieving being: (1) stopping rotation of a rotating member; or (2) coupling a driven member with a drive member.

The lawn mower apparatus 14 includes (1) a main support base assembly 16; (2) a handle assembly 18 connected to the support base assembly 16 for directing same; (3) a blade control assembly 20 which is connected to the base support assembly 16 and the handle assembly 18 and operable to engage a magnetic clutch brake mechanism 12 of this invention; (4) a power drive assembly 22 mounted on the support base assembly 16; and (5) the magnetic clutch brake mechanism 12 of this invention is connected to the power drive assembly 22. The support base assembly 16 includes a main base member 26 having a plurality, namely four, support wheel members 28 connected thereto for movement on a ground support surface in a conventional manner. The handle assembly 18 includes a U-shaped handle member 30 which is operable to maneuver the entire lawn mower apparatus 14 on the ground support surface.

The blade control assembly 20 includes an elongated cable member 34 which is operable to selectively engage and disengage the magnetic clutch brake mechanism 12 in a manner to be explained.

The power drive assembly 22 may be of a conventional nature being either an electric motor or a gasoline engine member 36 as desired. The engine member 36 is operable to drive an output power shaft 38 which, in turn, is secured to and rotates a lawn mower blade member 42. However, in this invention, the magnetic clutch brake mechanism 12 is mounted between the connection of the output power shaft 38 and the lawn mower blade member 42 so as to control rotation thereof for safety purposes.

As shown in FIG. 2, the magnetic clutch brake mechanism 12 of this invention includes: (1) a main actuator assembly 44; (2) a drive rotor assembly 46; (3) a clutch plate assembly 50 operably and selectively connected to the drive rotor assembly 46; and (4) a blade mount assembly 52 which is connected to the clutch plate assembly 50.

The main actuator assembly 44 includes an actuator bracket member 54 which is engageable with an actuator ring member 58. The actuator bracket member 54 is a generally rectangular plate construction having a pair of spring mount slots 55 at opposite ends thereof and a central hole 56 therein to allow the output power shaft 38 to extend therethrough. A spring mount assembly 60 is provided at each end of the actuator bracket member 54 so as to resiliently mount the same against a bottom surface 26a of the support base assembly 16 of the lawn mower apparatus 14. Each spring mount assembly 60 includes a compression spring member 63; a bolt member 61; a spacer member 62; and a nut member 65 so as to resiliently mount the actuator bracket member 54 which is movable by the cable member 34 of the blade control assembly 20.

Figure 5:
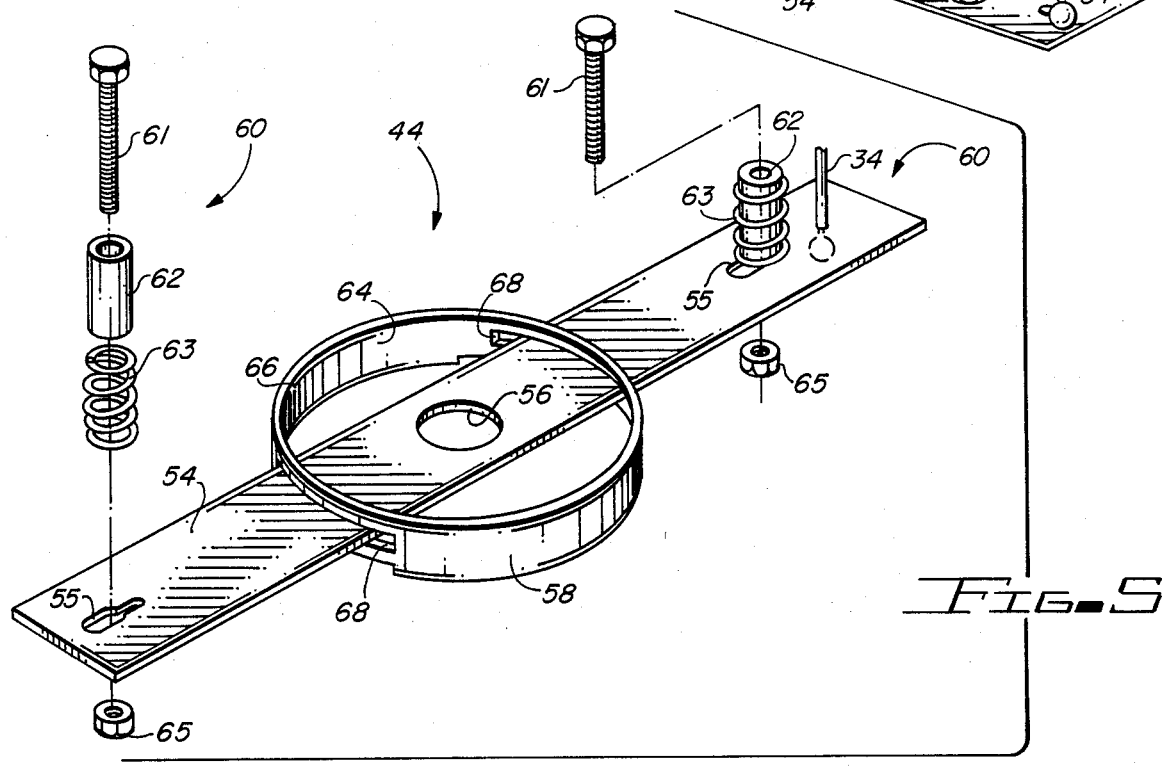
FIG. 5 is an exploded perspective view of the main actuator assembly of the magnetic clutch brake mechanism of this invention.

The actuator ring member 58 is of a generally cylindrical shape having a brake clutch member 64. The brake clutch member 64 has a cylindrical central section 66 and provided with opposed connector slots 68 therein. Each connector slot 68 of a generally elongated rectangular nature adapted to receive a portion of the actuator bracket member 54 therethrough as best shown in FIG. 5. It is noted that the actuator bracket member 54 is movable axially so as to conjointly move the actuator ring number 58 therewith which will affect the clutching and braking operations of this invention as will be explained.

The drive rotor assembly 46 includes a main cylindrical rotor member 70 having a connector hub member 74 integral with a main body member 76. The connector hub member 74 is provided with a shaft connector slot 75 for connection to the output power shaft 38 as by a lock key 78 in a conventional manner as shown in FIG. 2.

The main body member 76 is provided with a pair of opposed elongated slots 79 therein for the purposes of reducing weight, cooling, and airflow.

The clutch plate assembly 50 includes an upper cylindrical plate member 80; a bottom collector member 82; a magnet assembly 84 mounted between the plate member 80 and the collector member 82; and a central bearing member 86. The plate member 80 is of a cylindrical plate shape mounted against a top surface 87 of the magnet assembly 84 as will be explained. The collector member 82 is of a cylindrical plate shape having a plurality of adjacent spaced openings 83 therein for purposes of reducing weight, cooling, etc. The collector member 82 is provided with a central opening 85 therein to receive the bearing member 86 therein and to receive the output power shaft 38 therethrough. The bearing member 86 surrounds and contacts the output power shaft 38 to selectively allow the clutch plate assembly 50 to rotate or not rotate with the output power shaft 38 through a magnetic field connection to the drive rotor assembly 46 as will be explained.

The cylindrical plate member 80, the collector plate 82, and the magnetic assembly 84 cooperate to form a magnetic field assembly 90.

The magnetic assembly 84 includes a plurality of magnet members 94 which are secured between the plate member 80 and the collector plate 82. Each magnet member 94 is of a wedge shape and of a permanent magnet type having north and south poles acting in a standard manner.

The blade mount assembly 52 includes: (1) a blade mount member 98; (2) a blade connector assembly 102; and (3) a main connector assembly 104. The blade mount member 98 includes a main hub section 108 is adapted to receive the output power shaft 38 therethrough and as provided with connector lugs 99 at a top portion thereof. The connector lugs 99 are mounted within and secured at its periphery to similarly shaped slots 112 in the collector member 82 for conjoint rotation therewith.

The support section 110 is of a rectangular plate construction having a pair of spaced holes 109 therein to be connected by the blade connector assembly 102 to the lawn mower blade member 42. More specifically, the blade connector assembly 102 comprises a pair of nut and bolt members 114 for securing of the lawm mower blade member 42.

The main connector assembly 104 includes a washer member 118; a bolt member 120; and a bearing member 124. The bolt member 120 is mounted within internal threads 121 in a lower end section 122 of the output power shaft 38. The bearing member 124 provides a bearing surface 126 which allows the output power shaft 38 to rotate relative to the clutch plate assembly 50 and the lawn mower blade member 42.

USE AND OPERATION OF THE INVENTION

The lawn mower apparatus 14 of this invention is a substantially conventional type structure with the magnetic clutch brake mechanism 12 of this invention being utilized to achieve a government safety requirement on all new lawn mower structures. Generally, the government safety requirement is that a positive action must be taken to obtain rotation of a lawn mower blade member for safety purposes. Concurrently, this acts as dead man's control in that a certain control lever has to be positively actuated and held in a certain position in order for the lawn mower blade member to rotate.

As shown in FIG. 1, the magnetic clutch brake mechanism 12 of this invention is attached to a lower end section of the lawn mower output power shaft 38 so as to achieve control of the rotation of the lawn mower blade member 42. More particularly, the main actuator assembly 44 has the actuator bracket member 54 connected by the support spring assemblies 60 to the main base member 26 which allows for vertical movement but prevents rotation thereof. The blade control assembly 20 with the cable member 34 is connected as shown in FIG. 1 to achieve vertical movement of the actuator bracket number 54 and, more important, the actuator ring member 58. However, it is understood that numerous types of actuating systems can be utilized in order to move the actuator ring member 58 axially relative to the clutch plate assembly 50 to achieve operation of this invention as will be explained.

It is assumed that the power drive assembly 22 with the engine member 36 is energized which causes the output power shaft 38 to rotate.

With the actuator ring member 58 in the lower position so as to be adjacent to and enclose the clutch plate assembly 50, the magnetic fluxes therein are transferred through the clutch plate assembly 50 and the stationary actuator ring member 58 to cease any rotation of the clutch plate assembly 50 and interconnected blade mount assembly 52. This places the blade mount assembly 52 with the lawn mower blade member 42 mounted thereon in the stationary or "brake" condition. However, at this time it is seen that the output power shaft 38 continues to be rotated by the engine member 36 but, due to the shift in the magnetic fluxes, the drive rotor assembly 46 or rotor member 70 is not coupled to the clutch plate assembly 50 for the driving of same.

On raising of the actuator ring member 58 through the cable member 34, the magnetic field created therein is transferred through the drive rotor assembly 46 and the clutch plate assembly 50 which causes conjoint rotation thereof with the rotating output power shaft 38.

THEORY OF OPERATION OF THE INVENTION

The magnetic clutch brake mechanism 12 uses permanent magnets to selectively supply the coupling force to operate the clutch portion or the brake portion of the invention. The magnetic clutch brake mechanism 12 is shown in the brake mode in solid lines in FIG. 3 in that the brake or actuator ring member 58 is solidly in contact with the collector member 82 of the clutch plate assembly 50 and prevents its rotation since the actuator ring member 58 is mechanically retained from rotation. The actuator ring member 58 under spring forces from the spring members 63 has driven a lower clutch plate or collector member 82 away from the upper clutch plate or drive rotor assembly 46 and has caused s gap "A" to form between the collector member 82 and the drive rotor assembly 46.

The theory of operation is based on the principle that magnetic flux travels best in a magnetic medium (i.e. iron) and is essentially resisted by space. In any magnetic circuit, a closed sequence of magnetic materials coupling the north pole to the south pole of a magnet, the density of the magnetic flux flowing is a function of any "air gaps" and the volume of magnetic materials within the circuit. At the same time, the flux density within the circuit controls the forces with which the magnetic materials are pulled together at any existing air gaps.

On referring to FIG. 3, it is noted that the flux traveling within an upper collector or plate member 80 is free to travel in two separate magnetic circuits to enter the lower clutch plate or collector member 82 and thus return to the opposite pole of the permanent magnet member 94. Assuming the gap "A" does not yet exist, the magnetic flux may travel through the upper clutch plate or drive rotor assembly 46 into the lower clutch plate or collector member 82 and return to the lower pole of the permanent magnet assembly 84. The magnetic flux may also travel through the brake ring or actuator ring member 58 into the lower clutch plate or collector 82 and thus return to the lower pole of the permanent magnet assembly 84. Now observe the air gaps with both described magnetic circuits while assuming that gap "A" has not yet been created. These air gaps are labeled "B" and "C" and provide a controlled resistance in both of the magnetic circuits previously described.

More particularly, the air gap "C" is between the upper collector or plate member 80 and the upper clutch plate or drive rotor assembly 46 and the air gap "B" is between the upper collector or plate member 80 and the brake ring or actuator ring member 58. The air gaps "B" and "C" are intentionally of different widths with; for example, air gap "B" being 0.005 inch and air gap "C" being 0.015 inch. As presented earlier, the magnetic flux is restricted more at the 0.015 inch gap than at the 0.005 inch gap and can be demonstrated as the flux density across the gaps varies inversely as the square of the dimension of the gaps.

Mathematically:

$F_1$ = flux in the 0.005 inch air gap "B"
$F_2$ = flux in the 0.015 inch air gap "C"
Or;

$$F_1 = Mk \frac{1}{.005^2} \qquad \text{Equation (1)}$$

$$F_2 = Mk \frac{1}{.015^2} \qquad (2)$$

M = magnetic constants due to the permanent magnet and magnetic circuit materials.
k = space permeability constant
Divide equation (1) or (2)

$$\frac{F_1 = Mk \frac{1}{.005^2}}{F_2 = Mk \frac{1}{.015^2}}$$

$$\frac{F_1}{F_2} = \frac{.015^2}{.005^2}$$

$$\frac{F_1}{F_2} = \frac{.000225}{.000025} = 9$$

This analysis has shown us that nine times more flux travels through the narrow air gap "B" than through the wide air gap "C". It then follows that the brake ring or actuator ring member 58 is pulled very strongly against the collector member 82 while the drive rotor assembly 46 is very weakly attracted to the actuator ring member 58. The compression spring members 63 on the actuator brake member 54 can then push the lower or collector member 82 away from the drive rotor assembly 46 forming the air gap "A" and stopping any rotation of the magnetic clutch plate assembly 50. The clutch brake mechanism is now in the brake mode and the drive rotor assembly 46 will continue to rotate freely in space while the clutch plate assembly 50 is rigidly held by the actuator ring member 58.

In order to transfer the magnetic clutch brake mechanism 12 to the clutch mode, the actuator ring member 58 must be manually lifted. The collector member 82 is free to follow the actuator ring member 58 vertically until it contacts the drive rotor assembly 46. At this time, higher magnetic forces still exist between the actuator ring member 58 and the collector member 82. If a still larger force is applied in the vertical direction on the actuator ring member 58, an air gap will start to form between the actuator ring member 58 and the collector member 82. This air gap is designated "D" in FIG. 3. As the air gap "D" widens, the magnetic flux will increase suddenly across air gap "C" because, as the air gap "D" opens, the magnetic resistance of the circuit through the actuator ring member increases due to the summation of the two air gaps "B" and "D". The drive rotor assembly 46 and the collector member 82 are now forcefully held together by the magnetic flux flowing through them and torque from the power source (output power shaft 38) is being transferred to the driven mechanism (clutch plate assembly 50). The magnetic clutch brake mechanism 12 is now in the clutch mode and very little flux is traveling in the actuator ring member 58 as it has essentially been removed from its magnetic circuit. This will continue as long as the actuator ring member 58 is held in the elevated position.

When braking is again required, the actuator ring member 58 is released and will be driven back into the collector member 82 by the compression springs 63. After this has occured, the majority of the magnetic flux returns to the actuator ring member 58 due to the geometry previously discussed. The air gap "A" reappears and high magnetic forces develop between the actuator ring member 58 and the collector member 82. These high forces bring the rotating collector member 82 to a stop but will allow the drive rotor assembly 46 to continue to rotate as before.

Figure 6:
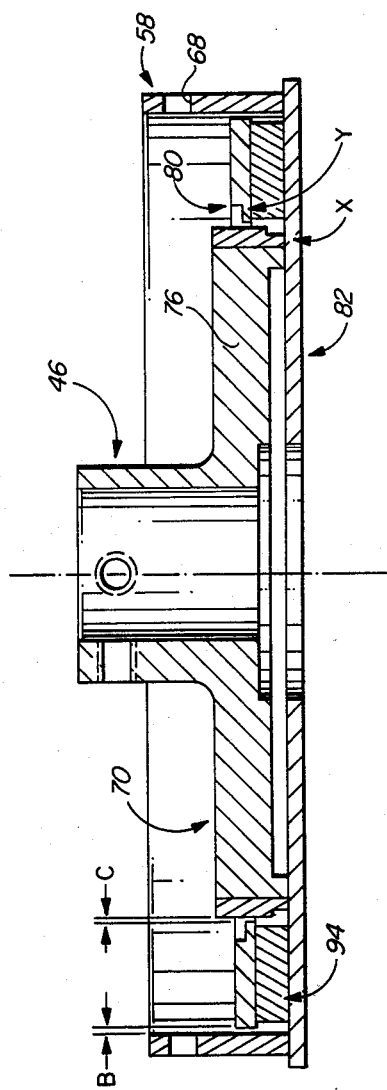
FIG. 6 is a fragmentary sectional view similar to FIG. 3 showing a second embodiment of the invention.

As shown in a second embodiment in FIG. 6, an alternate method of controlling the magnetic flux as it flows through the conducting members of the clutch-brake mechanism is to decrease the volume of material at the boundaries of the air gaps. The removal or notching the material at the boundaries or even at some point intermediate between the boundaries will reduce the volume of magnetic material and increase the resistance to magnetic flux flow. While not as efficient as controlling the air gaps in the magnetic circuits, it will none the less achieve means of control.

If the notching method or some other method of material reduction were used, then the air gaps B and C could be equal. The result would then be, assuming that the mechanism starts with both the rotor 46 and the brake ring 58 in contact with the clutch plate or collector member 82, a larger portion of the magnetic flux would flow through the brake ring 58 than the rotor 46. This occurs because the peripheral and circumferential narrowed sections indicated at x and y would become saturated and tend to resist magnetic flux flow. Then the major portion of the magnetic flux would flow through the plate member collector 80, the brake ring 58, and finally return to the permanent magnet 94 via the clutch plate 82. As when using the air gaps, the brake ring 58 would be drawn tightly against the clutch plate 82 and the rotor 46 would be held less tightly and the air gap A would form between the rotor 46 and the clutch plate 82. The brake ring would then stop the rotation of the clutch plate 82 and the rotor 46 would be free to continue to rotate.

The magnetic clutch brake mechanism of this invention is illustrated as attached to a lawn mower apparatus to control rotation of a lawn mower blade member but it is obvious that the same could be utilized as a clutch or braking system in numerous types of embodiments. For example, the magnetic clutch brake mechanism could be used for airplane propellers; car radiator fan blades; motor cooling fans; etc.

The magnetic clutch brake mechanism of this invention is substantially maintenance free; sturdy in construction; easy to operate; and provides the use of non-wearing magnetic field for the coupling mechanism.

While the invention has been described in conjunction with preferred specific embodiments thereof, it will be understood that this description is intended to illustrate and not to limit the scope of this invention, which is defined by the following claims:

I claim:

1. A coupling device using magnetic flux to selectively couple and brake members having relative rotation about an axis, comprising:
   (a) a rotatable drive member having a drive rotor assembly secured thereto;
   (b) a clutch plate assembly rotatably connected to said drive member and operably associated with said drive rotor assembly;
   (c) said clutch plate assembly having a magnetic field assembly mounted on a collector member creating a magnetic flux field within itself and said rotor assembly;
   (d) a main actuator assembly having an actuator ring member mounted about said clutch plate assembly and moveable axially relative thereto;
   (e) said actuator ring member in a brake mode when engaging said clutch plate assembly and a larger magnetic flux field is created between said actuator ring member and said magnetic field assembly to prevent rotation of said clutch plate assembly; and
   (f) said actuator ring member in a clutch mode is disengaged from said collector member and a magnetic flux field is created between said drive rotor assembly and said magnetic field assembly to cause rotation of said clutch plate assembly.

2. A coupling device as described in claim 1, wherein:
   (a) said drive rotor assembly includes a rotor member having an air gap "C" between same and said clutch plate assembly;
   (b) said actuator ring member includes a cylindrical section having an air gap "B" between same and said clutch plate assembly; and
   (c) said air gap "C" greater than said air gap "B" to create a greater flux density between said actuator ring member and said clutch plate assembly when in the brake mode.

3. A coupling device as described in claim 1, wherein:
   (a) said actuator ring member engages said collector member to move same away from said rotor member to magnetically disconnect said rotor member from said clutch plate assembly.

4. A coupling device as described in claim 1, wherein:

(a) said actuator ring member movable axially to create an air gap "D" between same and said clutch plate assembly to uncouple said actuator ring member to said clutch plate assembly to achieve the clutch mode.

5. A coupling device using magnetic flux to selectively couple and brake members having relative rotation about an axis, comprising:
   (a) a rotatable drive member having a drive rotor assembly secured thereto;
   (b) a clutch plate assembly rotatably connected to said drive member and operably associated with said drive rotor assembly;
   (c) said clutch plate assembly having magnetic field assembly creating a magnetic flux field within itself and said rotor assembly;
   (d) a main actuator assembly having an actuator ring member mounted about said clutch plate assembly and movable axially relative thereto;
   (e) said actuator ring member in a brake mode when engaging said clutch plate assembly and a larger magnetic flux field is created between said actuator ring member and said magnetic field assembly to prevent rotation of said clutch plate assembly; and
   (f) said actuator ring member engagable with said clutch plate assembly to create an air gap "A" between same and said drive rotor assembly to decrease magnetic flux therebetween when in the brake mode.

6. A coupling device as described in claim 5, wherein:
   (a) said main actuator assembly having an actuator bracket member engagable with said actuator ring member to selectively move same axially in the magnetic flux field.

7. A coupling device as described in claim 6, wherein:
   (a) said actuator bracket member moves said actuator ring member axially to decrease said air gap "A" to zero and achieve a clutch mode by coupling said clutch plate assembly to said rotor member whereby anything attached to said clutch plate assembly is rotated by said drive member and the subject magnetic coupling.

8. A coupling device using magnetic flux to selectively couple and brake members having relative rotation about an axis, comprising:
   (a) a rotatable drive member having a drive rotor assembly secured thereto;
   (b) a clutch plate assembly rotatably connected to said drive member and operably associated with said drive rotor assembly;
   (c) said clutch plate assembly having magnetic field assembly creating a magnetic flux field within itself and said rotor assembly;
   (d) a main actuator assembly having an actuator ring member mounted about said clutch plate assembly and movable axially relative thereto;
   (e) said actuator ring member in a brake mode when engaging said clutch plate assembly and a larger magnetic flux field is created between said actuator ring member and said magnetic field assembly to prevent rotation of said clutch plate assembly;
   (f) said clutch plate assembly having a plurality of magnet members mounted between a clutch plate member and a collector member; and
   (g) said clutch plate member engages said rotor member when in a clutch mode.

9. A coupling device as described in claim 8, wherein:
   (a) said magnet members surround said rotor member; and
   (b) said actuator ring member surrounds said magnet members whereby the larger magnetic field is selectively moved between (1) said rotor member and said clutch plate assembly; and (2) said actuator ring member and said clutch plate assembly.

10. A coupling device using magnetic flux to selectively couple and brake members having relative rotation about an axis, comprising:
    (a) a rotatable drive member having a drive rotor assembly secured thereto:
    (b) a clutch plate assembly rotatably connected to said drive member and operably associated with said drive rotor assembly;
    (c) said clutch plate assembly having magnetic field assembly creating a magnetic flux field within itself and said rotor assembly;
    (d) a main actuator assembly having an actuator ring member mounted about said clutch plate assembly and movable axially relative thereto;
    (e) said actuator ring member in a brake mode when engaging said clutch plate assembly and a larger magnetic flux field is created between said actuator ring member and said magnetic field assembly to prevent rotation of said clutch plate assembly; and
    (f) said drive rotor assembly includes a rotor member having an outer peripheral narrowed section between same and said clutch plate assembly; whereby magnetic flux flow is decreased across said narrowed section.

11. A coupling device as described in claim 10, wherein:
    (a) said drive rotor assembly includes a rotor member having an air gap "C" between same and said clutch plate assembly;
    (b) said actuator ring member includes a cylindrical section having an air gap "B" between same and said clutch plate assembly; and
    (c) said air gap "C" and said air gap "B" of equal size; whereby movement from the brake mode to a clutch mode is controlled by said narrowed section in said rotor member.

12. A coupling device using magnetic flux to selectively couple and brake members having relative rotation about an axis, comprising:
    (a) a rotatable drive member having a drive rotor assembly secured thereto;
    (b) a clutch plate assembly rotatably connected to said drive member and operably associated with said drive rotor assembly;
    (c) said clutch plate assembly having a magnetic field assembly creating a magnetic flux field within itself and said rotor assembly;
    (d) a main actuator assembly having an actuator ring member mounted about said clutch plate assembly and movable axially relative thereto;
    (e) said actuator ring member in a brake mode when engaging said clutch plate assembly and a larger magnetic flux field is created between said actuator ring member and said magnetic field assembly to prevent rotation of said clutch plate assembly;
    (f) said clutch plate assembly includes a plate member and a collector member with a magnetic assembly mounted therebetween; and
    (g) said plate member having an inner peripheral narrowed section between same and said rotor assembly; whereby magnetic flux flow is decreased across said narrowed section in said plate member.

13. A coupling device as described in claim 12, wherein:
 (a) said drive rotor assembly includes a rotor member having an air gap "C" between same and said clutch plate assembly;
 (b) said actuator ring member includes a cylindrical section having an air gap "B" between same and said clutch plate assembly; and
 (c) said air gap "C" and said air gap "B" of equal size; whereby movement from the brake mode to a clutch mode is controlled by said narrowed section in said plate member.

14. A coupling device using magnetic flux to selectively couple and brake members having relative rotation about an axis, comprising:
 (a) a rotatable drive member having a drive rotor assembly secured thereto;
 (b) a clutch plate assembly rotatably connected to said drive member and operably associated with said drive rotor assembly;
 (c) said clutch plate assembly having magnetic field assembly creating a magnetic flux field within itself and said rotor assembly;
 (d) a main actuator assembly having an actuator ring member mounted about said clutch plate assembly and movable axially relative thereto;
 (e) said actuator ring member in a brake mode when engaging said clutch plate assembly and a larger magnetic flux field is created between said actuator ring member and said magnetic field assembly to prevent rotation of said clutch assembly;
 (f) said drive rotor assembly includes a rotor member having an outer peripheral narrowed section between same and said clutch plate assembly; and
 (g) said plate member having an inner peripheral narrowed section between same and said rotor assembly; whereby magnetic flux flow is decreased across said narrowed section in said plate.

15. A coupling device as described in claim 14, wherein:
 (a) said drive rotor assembly includes a rotor member having an air gap "C" between same and said clutch plate assembly;
 (b) said actuator ring member includes a cylindrical section having an air gap "B" between same and said clutch plate assembly; and
 (c) said air gap "C" and said air gap "B" of equal size; whereby movement from the brake mode to a clutch mode is controlled by said narrowed section in said rotor member and said narrowed section in said clutch plate member.

* * * * *